United States Patent [19]

Goode

[11] Patent Number: 5,027,352
[45] Date of Patent: Jun. 25, 1991

[54] RECEIVER FREQUENCY OFFSET BIAS CIRCUIT FOR TDM RADIOS

[75] Inventor: Steven H. Goode, Palatine, Ill.

[73] Assignee: Motorola, Inc., Schaumburg, Ill.

[21] Appl. No.: 293,285

[22] Filed: Jan. 5, 1989

[51] Int. Cl.$^5$ .............................................. H04J 3/12
[52] U.S. Cl. ................................... 370/110.1; 455/231
[58] Field of Search ......................... 370/100.1, 110.1; 455/62, 183, 231, 214, 312, 334; 375/111, 113, 114, 76

[56] References Cited

U.S. PATENT DOCUMENTS

| | | | |
|---|---|---|---|
| 3,919,651 | 11/1975 | LeMouel | 329/104 |
| 4,114,097 | 9/1978 | Kubo et al. | 325/320 |
| 4,286,223 | 8/1981 | Shearer | 329/50 |
| 4,291,269 | 9/1981 | Nossen | 324/79 D |
| 4,518,922 | 5/1985 | Luecke | 329/50 |
| 4,527,278 | 7/1985 | Deconche et al. | 375/97 |
| 4,547,737 | 10/1985 | Gibson | 329/50 |
| 4,575,863 | 3/1986 | Butcher et al. | 375/114 |
| 4,583,048 | 4/1986 | Gumacos et al. | 329/122 |
| 4,625,320 | 11/1986 | Butcher | 375/76 |
| 4,631,737 | 12/1986 | Davis et al. | 375/88 |
| 4,742,514 | 8/1988 | Goode et al. | 370/109 |
| 4,829,594 | 5/1989 | Heck et al. | 455/334 |
| 4,873,702 | 10/1989 | Chiu | 375/76 |
| 4,910,753 | 3/1990 | Wakatsuki et al. | 375/76 |

*Primary Examiner*—Douglas W. Olms
*Assistant Examiner*—Melvin Marcelo
*Attorney, Agent, or Firm*—Douglas A. Boehm

[57] ABSTRACT

An improved bias control circuit (FIG. 2) is disclosed for a radio receiver (122) used in a communication system wherein a signalling preamble is sent prior to sending other information. The bias circuit (140) rapidly determines the DC voltage level representing the average frequency of the received signalling preamble (215), develops a DC bias voltage (275) proportional to the error in frequency between the receiver and the transmitted signal, and then selectively applies this bias voltage to the series coupling capacitor (240) located between the receiver detector (121) and the receiver processing circuitry (123). The circuit is adapted for a 0.2 GMSK receiver in a TDMA communication system, where a known 1100 bit synchronization preamble is sent in each user's TDM time slot.

33 Claims, 4 Drawing Sheets

RECEIVER FREQUENCY OFFSET BIAS CIRCUIT FOR TDM RADIOS

CROSS-REFERENCE TO RELATED APPLICATIONS

The present application incorporates by reference U.S. Pat. No. 4,742,514, entitled "Method and Apparatus for Controlling a TDM Communication Device", which is assigned to the same assignee as the present invention.

BACKGROUND OF THE INVENTION

This invention relates generally to the field of radio frequency (RF) communications, and, more specifically, to an improved technique for quickly adjusting the frequency offset bias of a non-coherent 0.2 Gaussian minimum shift keying (GMSK) receiver detector. The invention is particularly useful for radios operating in a time division multiplexed (TDM) communication system.

Recently, there has been an increased demand for voice, digital voice, and high-speed data communications over land mobile radio channels. Since the radio frequency spectrum is inherently limited, one must devise new system concepts and organizational features to accommodate the increased demand for mobile and portable radio communications services. Time-division multiple access (TDMA) is one method of achieving more efficient spectrum utilization.

In its simplest form, a TDMA system is comprised of a transmitting base station capable of time-multiplexing messages from at least two users on a single RF channel, and one or more remote receiving stations capable of receiving at least one of the time-multiplexed messages. Typically, the receiving station would be a mobile or portable unit capable of transmitting a TDM message to the base station (or repeater station) on a second (or the same) RF channel. Refer to U.S. Pat. No. 4,742,514 entitled "Method and Apparatus for Controlling a TDM Communication Device", for further information regarding TDMA.

In a TDM system, the base station (or repeater station) must be capable of receiving short bursts of information from all mobile and portable units (remote units) within the system. Each of these remote units may transmit on slightly different frequencies due to different environmental factors, e.g., power supply voltage fluctuations, ambient temperature variations, etc. Each mobile or portable unit may also transmit on slightly different frequencies due to differences in their internal frequency references. In a frequency modulation (FM) receiver, this frequency difference translates into a DC offset bias voltage at the detector. In order for the base station to receive all of the TDM information burst from a remote unit, the base station receiver must quickly adjust its receive frequency offset to the transmitted frequency of the incoming signal.

This requirement for fast frequency acquisition often conflicts with the requirement to receive low frequency information present in the TDM burst. This conflict can readily be observed in a TDM system using FM to transmit the data. If the TDM data contains low frequency information, e.g., when the information is non-return-to-zero (NRZ) data, or if it contains low frequency signalling tones, e.g., sub-audible digital private line (DPL ™), or if it uses an analog method to scramble speech, e.g., frequency-inversion voice scrambling, the FM receiver discriminator must be coupled at a very low frequency to the information processing circuits, in order to pass the lowest frequency of interest. A large valued AC coupling capacitor is often used to series couple digital information from the discriminator to a limiter, such that a microprocessor can then be used to decode the data. Such low frequency AC coupling requires a significant amount of time for the receiver circuitry to adjust to any frequency offset between the transmitter and receiver. Depending on the actual frequency offset, this acquisition time can be more than the entire length of the TDM burst.

Various methods have been used to adjust the receiver frequency to the transmitter frequency in an FM radio communication system. U.S. Pat. No. 4,518,922 utilizes one common approach, which is the use of an automatic frequency control (AFC) circuit, in which the incoming signal is averaged over a period of time in order to find the frequency error between the transmitter and receiver. An error signal is then used to adjust the receiver local oscillator to the transmitted frequency. However, AFC circuits are generally not suitable for TDM systems, due to the long time averages which must be taken to find the frequency offsets. Again, this averaging (acquisition) time may be longer than the entire length of the TDM burst.

Using another approach, U.S. Pat. No. 4,575,863 discloses a programmable bias circuit for quickly adjusting the data limiter offset bias to a received FSK data stream. This method utilizes a fast time constant to determine the center frequency of the received signal for the limiter when the data receiver is idle, and then switches to a slow time constant after word synchronization has been detected. However, any such "center-slicer" based approach will not work in those TDM systems which don't transmit digital data in the information time slot (e.g., wherein analog voice information is sent instead of digital vocoded speech information). Moreover, it is not practical to use this approach in TDM systems transmitting data using modulation techniques which do not lend themselves to detection using a center frequency reference (e.g., 0.2 GMSK, having a small "eye opening").

A need, therefore, exists to provide a method and means for fast frequency acquisition of a TDM transmitted signal by the receiver, while at the same time allowing low frequency coupling of the received information to the information processing circuits.

SUMMARY OF THE INVENTION

Accordingly, it is an object of the present invention to provide an improved receiver frequency offset bias circuit for digital TDM radios.

Another object of the present invention is to provide an improved technique for quickly compensating for the frequency offset bias of a non-coherent 0.2 Gaussian minimum shift keying (GMSK) receiver detector.

These and other objects are achieved by the present invention which, briefly described, is an improved bias control circuit for a radio receiver used in a communication system wherein a signalling preamble is sent to a receiver prior to sending other information. The bias circuit of the present invention rapidly determines the DC voltage level representing the average frequency of the received signalling preamble, develops a DC bias voltage proportional to the error in frequency between the receiver and the transmitted signal, and then applies this bias voltage to the series coupling capacitor located between the receiver detector and the receiver processing circuits. The coupling capacitor is then properly biased for reception of the transmitted information.

The bias control circuit comprises the series coupling capacitor having an input terminal and an output terminal, a means for selectively coupling the capacitor input terminal to a received input signal in response to an input control signal, a means for biasing the capacitor input terminal to a desired voltage in response to the input control signal, and a means for providing the input control signal in response to the signalling preamble. The circuit further comprises a means for biasing the capacitor output terminal to a desired voltage in response to the input control signal.

In the preferred embodiment of a 0.2 GMSK receiver in a TDMA communication system, the frequency averaging is performed during the known 1100 bit synchronization preamble of each user's TDM time slot. However, any balanced signal can be used as the preamble. Moreover, the present invention can be used with analog information, since no limiting is required by the circuit for proper biasing. The invention is particularly adapted for TDMA communication systems in which remote units typically have some frequency offset, where low frequency coupling is necessary for data decoding, and in which the preamble duration is relatively short.

BRIEF DESCRIPTION OF THE DRAWINGS

The features of the present invention which are believed to be novel are set forth with particularity in the appended claims. The invention, together with further objects and advantages thereof, may best be understood by reference to the following description, taken in conjunction with the accompanying drawings, in several figures of which like-referenced numerals identify like elements, and which:

DETAILED DESCRIPTION OF THE PREFERRED EMBODIMENT

The TDM system of the preferred embodiment is comprised of a repeater station capable of time-multiplexing messages from at least two users, and a portable or mobile station for each user. As used herein, a mobile unit is defined as a radio transceiver typically carried in vehicles; a portable unit as typically carried about a person; and a base or repeater station unit as typically a permanent or semi-permanent installation at a fixed location. Mobile units and portable units are hereinafter collectively referred to as remote units. Although the present invention is primarily intended for use in a TDM digital voice radio communication system utilizing GMSK modulation, it is contemplated that the frequency offset biasing technique of the present invention may be used in any radio system configuration.

Figure 1:
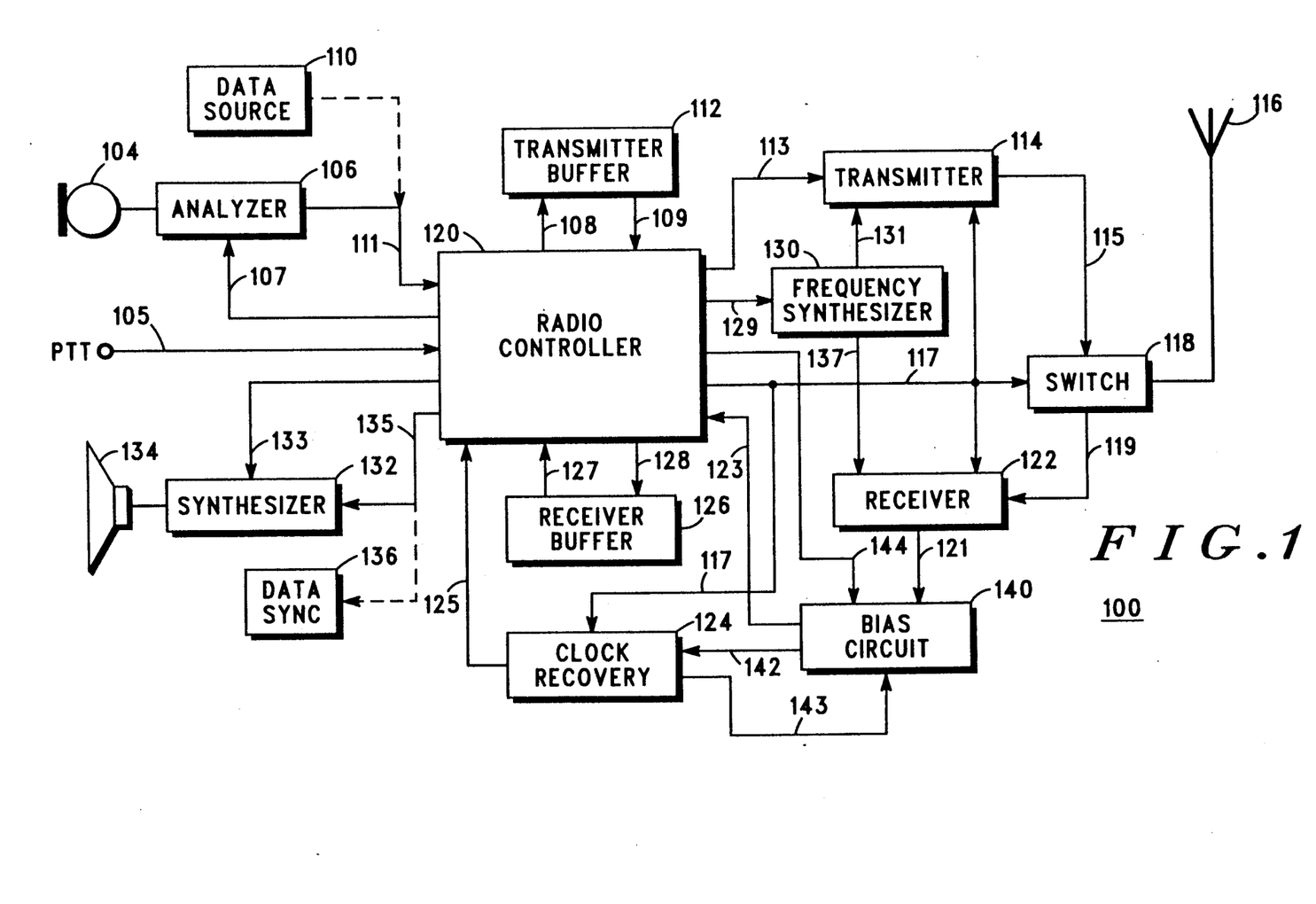
FIG. 1 is a general block diagram of a TDM radio transceiver illustrating the receiver frequency offset bias circuit according to the present invention.

Referring now to FIG. 1, there is shown a block diagram of remote radio transceiver 100. A speech signal is input from a user via microphone 104. The speech is analyzed by vocoder analyzer 106, which is enabled by radio controller 120 via connection 107. In the preferred embodiment, analyzer 106 is a sub-band coder, although any suitable voice coding technique may be used. Digital data information from data source 110 may also be transmitted in the same manner. Moreover, a combination of vocoded speech and data may alternately be transmitted as determined by a particular user.

Radio controller 120 inputs the vocoded speech or data, and routes it to transmit buffer 112 for storage via data line 108. Transmit buffer 112 is loaded at the vocoding data rate, such as, for example, 8.66 kilobits per second (kbps). When transmit buffer 112 has reached a predetermined capacity, the information is extracted by the radio controller via connection 109, added to signalling overhead data, and routed via line 113 to transmitter 114. PTT line 105 represents the push-to-talk switch of the microphone. Upon the reception of the PTT signal, controller 120 outputs a TX/RX control signal via line 117 to transmitter 114, receiver 122, and frequency synthesizer 130. During a transmit burst, the radio controller couples the transmitter output to antenna 116 via activating switch 118. Alternatively, switch 118 could be replaced with a duplexer or the like to continually couple the transmitter and receiver to the antenna.

To receive information from a TDM slot, radio controller 120 couples antenna 116 to receiver 122 via switch 118. The demodulated signal at 121 is then routed to the receiver frequency offset bias circuit 140. The output of bias circuit 140 is them routed to radio controller 120 via output 123, and to clock recovery circuit 124 via output 142. Input control signal 144 from radio controller 120, and input control signal 143 from clock recovery circuit 124, are applied to bias circuit 140 These signals will be fully described below. The recovered clock output at 125 is then coupled to radio controller 120 for use in synchronizing the controller to the received information.

When synchronized, controller 120 routes the received vocoded speech or digital data to receive buffer 126 via connection 128. This information is clocked into the received buffer at a suitable data rate, which typically is the transmission data rate. The information is subsequently extracted from receive buffer 126 via connection 127, and routed through the controller to vocoding synthesizer 132. This speech synthesizer, enabled by connection 133, operates on the essential speech components to synthesize the voice signal. The speech signal is then applied to speaker 134 to permit the received message to be heard by the operator. If, however, data was transmitted during the TDM slot, data sink 136, which may be a printer or monitor device, accepts the data and displays it for the user. Refer to U.S. Pat. No. 4,742,514 for a further description of radio transceiver 100 operation.

A TDM system generally sends a signalling preamble at the beginning of every burst of data from the mobile. (Refer to the TDM time slot illustrations of FIGS. 2 and 3 of U.S. Pat. No. 4,742,514 for a further description of such a preamble.) In the preferred embodiment, the 1.22 millisecond (ms) preamble contains 22 bits of 1100 pattern to allow the repeater to obtain bit synchronization.

Various other synchronization and identification codes are also sent prior to the vocoded speech information. Each user's TDM time slot is 120 ms in duration. It is with the intelligent utilization of this bit sync preamble that the frequency offset bias circuit determines the proper DC bias voltage for the receiver.

Figure 2:
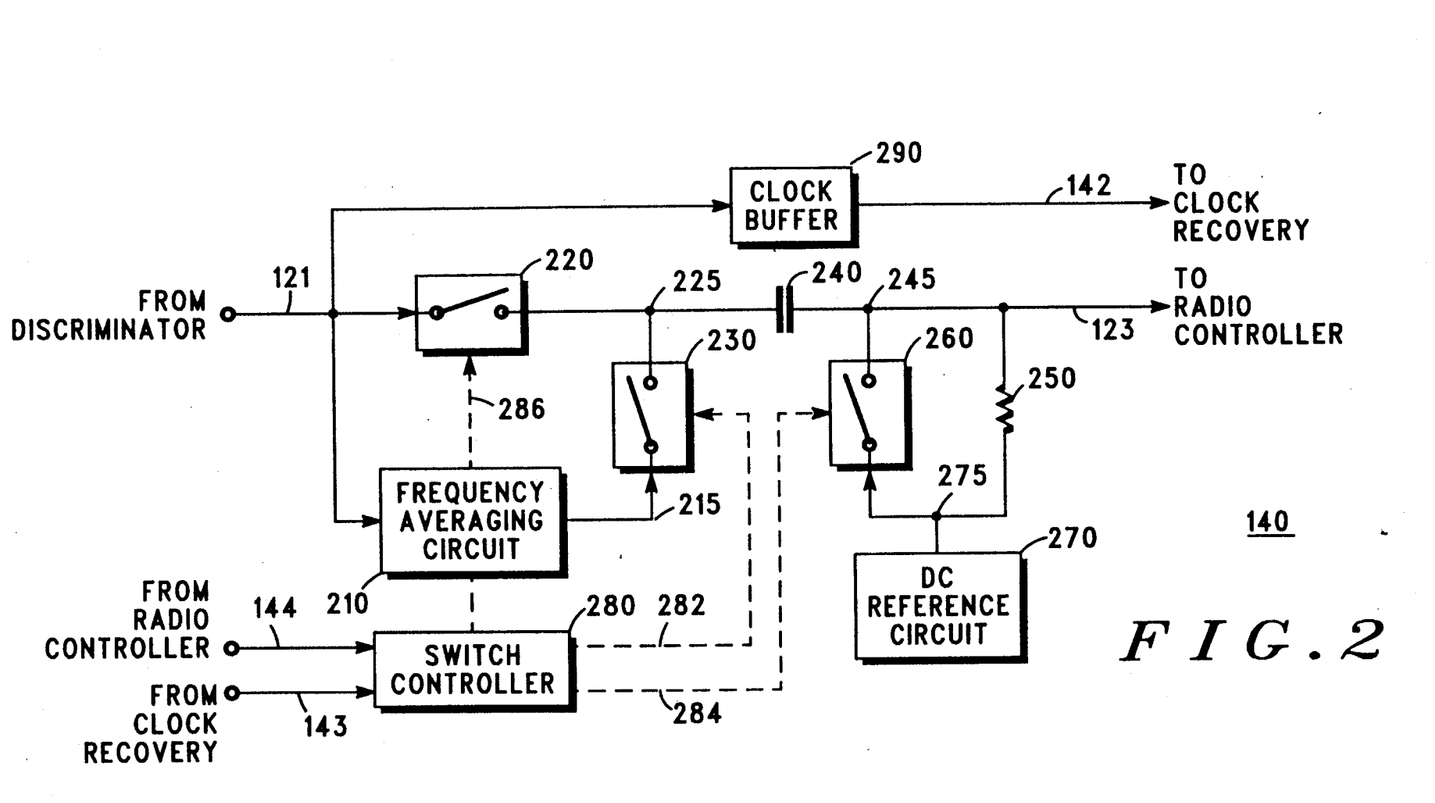
FIG. 2 is a detailed block diagram of the receiver frequency offset bias circuit of FIG. 1.

FIG. 2 illustrates in detail the individual blocks comprising receiver frequency offset bias circuit 140. In general, bias circuit 140 comprises AC coupling capacitor 240, having its input terminal 225 coupled either through switch 220 to the receiver discriminator output at 121, or coupled through switch 230 to frequency averaging circuit 210. These components serve to control the bias on the input side of capacitor 240. The output terminal 245 is directly connected via output line 123 to radio controller 120, and is selectively coupled to DC reference circuit 270 through switch 260. These components serve to control the bias on the output side of capacitor 240. All switches are controlled by switch controller 280. Received signal 121 from the output of receiver 122, such as the demodulated output of an FM receiver discriminator, is applied to frequency averaging circuit 210, clock buffer 290, and switch 220. Clock buffer 290 routes the received signal to clock recovery circuit 124 via output 142 such that it can immediately begin to synchronize to the incoming bit sync preamble.

Switch controller 280 utilizes input control signals 143 and 144 to determine how to configure bias circuit 140. The controller has two basic modes of operation: a receive mode and a charge mode. In the receive mode, switch 220 is closed, such that the discriminator output is coupled to the radio controller such that it may receive the TDM information burst. In the charge mode, switch 220 is open and switch 230 is closed, such that the bias circuit is pre-charging the coupling capacitor to the correct bias point. The operational steps performed by controller 280 will be fully described in conjunction with FIG. 5.

For the majority of the time, switch controller 280 remains in the receive mode, such that switch 220 is closed, connecting the receiver output directly to capacitor 240. Controller 280 has also instructed switch 230 to open, thus isolating capacitor 240 from frequency averaging circuit 210. Switch 260 was also open, thereby connecting the output of capacitor 240 to the output of DC reference circuit 270 through resistor 250. DC reference circuit 270 provides the DC level for normal operation of the information processing circuits in radio controller 120. Thus configured, the discriminator output of receiver 122 is capacitively coupled to the receiver processing circuits of 120 through a high-pass filter formed by capacitor 240 and resistor 250. These component values are designed to allow the lowest frequency of interest in the TDM data burst to be passed without attenuation.

At the start of receiving each TDM data message, radio controller 120 provides such indication to bias circuit switch controller 280 via line 144. During the next 1.22 ms while the clock recovery circuit is bit synchronizing, frequency averaging circuit 210 generates a bias voltage proportional to the center frequency of the incoming received signal. For the output of an FM receiver discriminator, this will be the average DC voltage of the incoming signal. In the preferred embodiment, a 1100 bit pattern ensures that the preamble signal is balanced to a 50% duty cycle. However, any balanced preamble waveform may be used.

Controller 280 remains configured in the receive mode until bit sync is obtained in clock recovery circuit 124. Upon acquiring bit sync, clock recovery circuit 124 signals the switch controller 280, via line 143, that bit synchronization has been accomplished and a valid signal is being received. In the present embodiment, bit sync is used to determine if a signal is present in the instant TDM time slot. Other methods of signal presence can also be used, such as a fast-acting signal power level measurement from a received signal strength indicator (RSSI) circuit. It is also possible to configure controller 280 to simply wait a fixed time period from the beginning of the TDM burst indicated on line 144, and assume that a received signal is present.

Upon receipt of a signal presence indication on line 143, switch controller 280 enters the charging mode, and opens switch 220 and closes switch 230 via lines 286 and 282, respectively. This action connects the DC output 215 of frequency averaging circuit 210 directly to input terminal 225 of capacitor 240. Switch controller 280 also closes switch 260 via line 284, connecting the DC reference circuit output 275 directly to output terminal 245 of capacitor 240. This configuration rapidly charges capacitor 240 to the voltage required to properly receive the TDM burst. Switch controller 280 waits 50 microseconds before returning switches 220, 230, and 260 to their respective receive mode positions.

Figure 3:
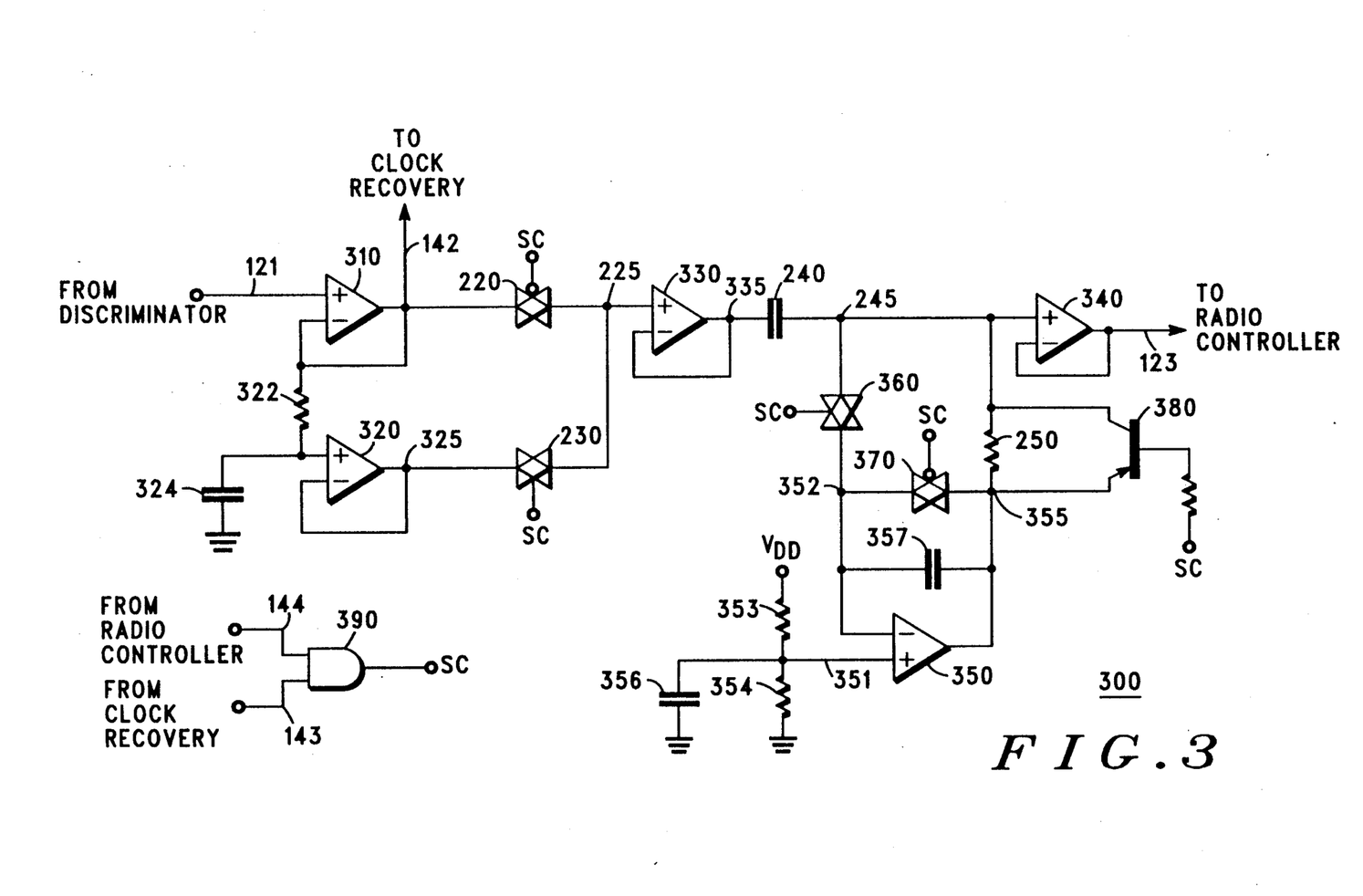
FIG. 3 is a schematic diagram of the preferred embodiment of the receiver frequency offset bias circuit.

FIG. 3 is a detailed schematic diagram of receiver frequency offset bias circuit 300 in accordance with the preferred embodiment. Several differences from the previous figure should be noted. First, a simple "AND" circuit function is used to control the switches, since the remaining decision-making and timing functions have been incorporated into the single microcomputer used to implement radio controller 120. Second, several buffer stages have been added to provide high impedance input and low impedance outputs to several points in the circuit. Third, additional components are used to improve the charging speed of DC reference circuit 270. Each of these differences will now be explained.

The switch control signal SC is produced by the logical "AND" of input control signals 143 and 144. At the start of each TDM time slot, input signal 144 is set to a logical one by radio controller 120. After bit sync has been achieved, input signal 143 is set to a logical one for only one bit period. Hence, it is only when these signals coincide is the SC output of AND gate 390 set to a logical one.

Operational amplifiers 310 and 340 are used as impedance transformation buffers to couple the received signal into and out of bias circuit 300. Note that amplifier 330 is not necessarily a limiter, as the present invention can correct for frequency offsets of analog information without "center-slicing" digital data. Operational amplifier 330 is used as a buffer to apply bias to the input terminal 335 of capacitor 240, since CMOS switch 220 and 240 exhibit some finite "on" resistance, e.g., 300 ohms.

Resistor 322, capacitor 324, and operation amplifier 320 comprise frequency averaging circuit 210. Resistor 322 and capacitor 324 integrate the average received frequency over the bit sync acquisition time, i.e., usually 16 bits. This average DC level is then buffered by operational amplifier 320, and made available at node 325 to switch 230 when the switch control signal SC is high, switch 230 is turned on, switch 220 is turned off, and the input terminal of the coupling capacitor is pre-charged through buffer 330.

The voltage for DC reference circuit 270 is developed by resistors 353 and 354, filtered by capacitor 356, and applied to operational amplifier 350. In the receive mode, switch 370 is closed, switch 360 is open, and transistor 380 is off, such that amplifier 350 is configured as a unity-gain buffer. Hence, the DC reference voltage at node 351, now available at node 355, is applied to the output terminal 245 of capacitor 240 through resistor 250.

In the charge mode, switch 370 is opened, switch 360 is closed, and transistor 380 is turned on. Transistor 380 is used as switch 260 of FIG. 2 to provide a low impedance path from node 355 to capacitor 240, since a CMOS switch would have some internal resistance. Switch 360 senses the voltage at terminal 245 of capacitor 240, while not allowing a large current flow through the sense switch 360. If desired, switch 360 could be a high value resistor. A CMOS switch is used here such that no charging current flows through the sensing path. In this sensing configuration, operational amplifier 350 monitors the voltage at output terminal 245, compares it to DC reference voltage at node 351, and applies the measured difference voltage at node 355 to terminal 245 through transistor 380. Thus, the charging voltage is the voltage difference between capacitor terminals 335 and 245. Applying this measured difference voltage to capacitor 240 provides faster charging capability than simply keeping operational amplifier configured as a buffer. Capacitor 357 prevents oscillation in the sensing configuration. Therefore, in the charge mode, a low impedance path is configured from DC reference node 355, through transistor 380, to terminal 254 of capacitor 240. In charging both sides of capacitor 240 simultaneously, the receiver frequency offset bias circuit quickly prepares the receiver for reception of the TDM burst.

In the preferred embodiment, bias circuit 300 is comprised of Motorola MC3303 operational amplifiers, Motorola MC14053 CMOS switches, and a Motorola MC14081 AND gate. Resistor 250 is 1 Megohms, capacitor 240 is 0.4 microfahrads, resistor 322 is 10 kilohms, and capacitor 324 is 0.015 microfahrads. Note that the frequency averaging integration time constant of 0.15 ms is shorter than the duration of the signalling preamble, such that the proper biasing voltage can quickly be determined. Also note that the value of capacitor 240 is relatively large such that frequencies as low as 0.4 Hz can be coupled to the signal processing circuitry of radio controller 120.

Figure 4:
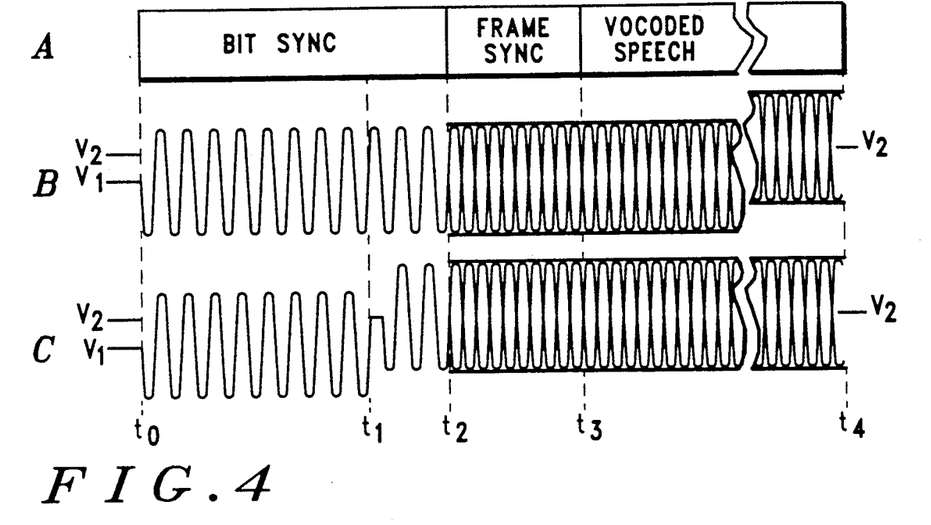
FIGS. 4a, 4b, and 4c represent various waveforms of the circuit of FIG. 3, illustrating TDM burst timing and voltage level relationships.

FIGS. 4a, 4b, and 4c represent various waveforms of the bias circuit of FIG. 3. FIG. 4a illustrates a representative TDM time slot. Time $t_0$ represents the start of the TDM burst, and time $t_4$ represents the end of the burst. The bit sync word preamble may be followed at $t_2$ by other synchronization and/or identification information, which is then followed by the vocoded speech information at $t_3$.

FIG. 4b represents the voltage waveform appearing at output 123 to be decoded by the radio controller information processing circuitry if the receiver frequency offset bias circuit is not used. If the receiver frequency is not identical to the transmitter frequency, the received signal exhibits an average frequency bias level, given by $V_1$, which is not equal to bias voltage $V_2$ developed in DC reference circuit 280. In terms of FIG. 3, voltage $V_1$ would be the DC level seen at input line 121, and would appear at node 325. Voltage $V_2$ would appear at nodes 351 and 355. As can be seen in FIG. 4b, the voltage waveform has not become centered around $V_2$ by the start of the TDM information at $t_2$, i.e., frame sync, which must be accurately decoded. Note that by time $t_4$, the received signal voltage waveform may have charged to $V_2$, depending on the charging time constant of capacitor 240/resistor 250 as compared to the TDM time slot $t_0$–$t_4$. Since the radio controller's signal processor operates at bias level $V_2$, the voltage waveform must be centered about this bias voltage at time $t_2$. Otherwise, no information would have been received in the entire TDM slot if the voltage difference $V_1$–$V_2$ exceeds the allowable input signal decoding limits of the signal processor. Note also that for a TDM system using 0.2 GMSK modulation, these allowable decoding limits would be less due to the reduced eye opening of the GMSK signal.

FIG. 4c illustrates the same waveform when the receiver frequency offset bias circuit of the present invention is allowed to compensate the receiver for the receiver frequency offset. Time $t_1$ represents the time required for the clock recovery circuit to detect the presence of the TDM signal. Hence, at time $t_1$, bit sync is achieved, and switch controller 280 is instructed to set bias circuit 140 into the charge mode. As explained above, the circuitry rapidly charges both sides of capacitor 240 to the proper voltage for one bit time after time $t_1$, thus centering the output waveform about voltage $V_2$ as opposed to $V_1$. Accordingly, the information processing circuitry of the radio can now properly decode the data.

Figure 5:
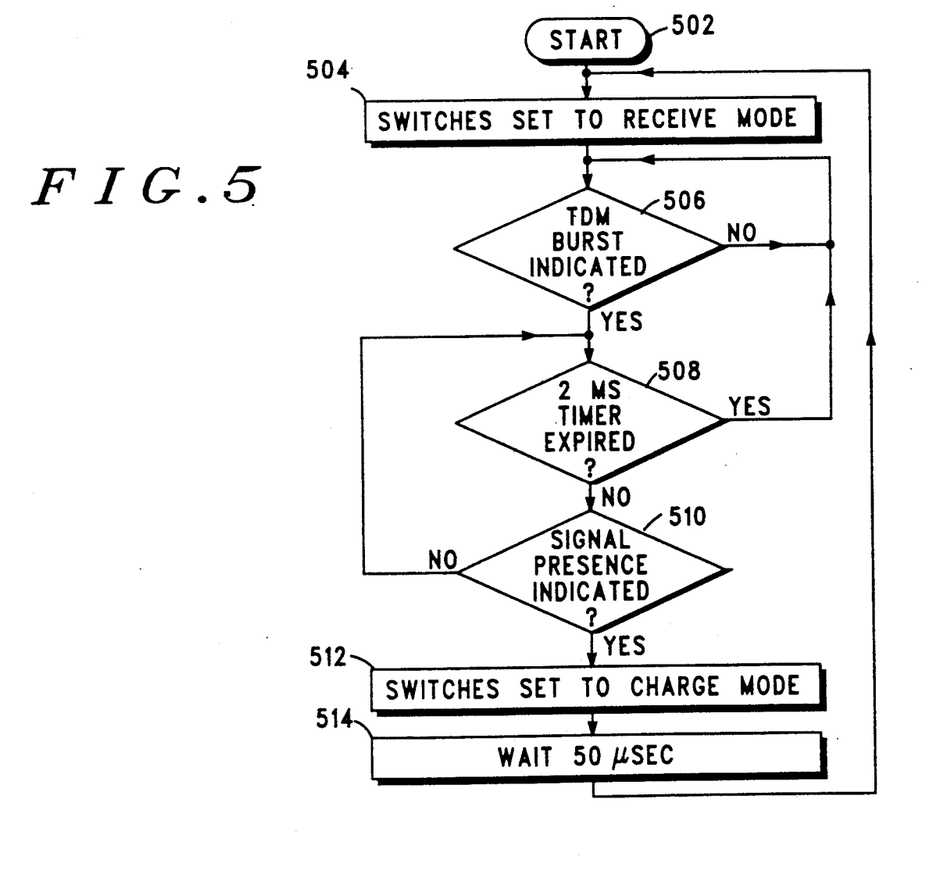
FIG. 5 is a flowchart illustrating the sequence of operations performed by switch controller 280 of FIG. 2.

The flowchart of FIG. 5 illustrates the complete sequence of events performed by switch controller 280. Controller 280 could be a microprocessor, such as, for example, a Motorola MC6801, dedicated hardware circuitry, or both as described above for FIG. 3.

When the TDM receiver is first turned on, controller 280 starts at Step 502. At Step 504 the controller sets the bias circuit switches to the receive mode, i.e., switch 220 closed, switches 230 and 260 opened. In terms of FIG. 3, switch control SC is low, such that only switches 220 and 370 are turned on.

The controller then tests for an indication of the start of a TDM time slot from the radio controller 120 in Step 506. This indication is provided at $t_0$ via line 144. Upon receipt of such indication, the controller starts a 2 millisecond timer. At Step 508, this timer is checked to see if it has expired. If 2 ms has passed, control returns to Step 506 to wait for the next TDM burst. If the timer has not expired, the controller then tests for the indication of signal presence from clock recovery circuit 124 in Step 510. This second indication is provided via line 143, at time $t_1$. If no signal presence indication is received, control returns to Step 506 to again check the timer. Hence, the 2 ms timer ensures that the bias circuit only pre-charges the coupling capacitor once per time slot at the proper time after the 1.22 ms signalling preamble, as opposed to possibly interrupting the actual decoding of information if bit sync is lost and re-acquired.

If a signal presence indication is received within 2 ms from the start of the TDM time slot, then the controller sets the bias circuit switches to the charge mode in Step 512, i.e., switch 220 opened, switches 230 and 260 closed. Again, in terms of FIG. 3, switch control SC goes high, such that switches 230 and 360 and transistor 380 are turned on. The controller then waits 50 microseconds in Step 514 before returning to Step 504, where it reconfigures the bias circuit to the receive mode.

In review, an improved method and means for compensating for the receiver frequency offset bias voltage has been shown. In the charge mode, the receiver's series coupling capacitor is rapidly charged to the DC level representing the average frequency of the received signalling preamble on the input side of the capacitor, and is charged to the receiver's DC reference level on the output side, both through low impedance paths. The invention may be utilized in any preamble-based signalling system, whether or not digital data is transmitted.

While only particular embodiments of the invention have been shown and described herein, it will be obvious that further modifications may be made without departing from the invention in its broader aspects. For example, it is contemplated that any balanced signal can be used as the preamble, as opposed to a 1100 bit synchronization pattern. Moreover, any simplex, duplex or TDM radio system utilizing any preamble-based signalling scheme may employ the techniques described herein. Accordingly, the claims are intended to cover all such changes and alternative constructions that fall within the true scope and spirit of the invention.

What is claimed is:

1. A bias control circuit for a radio receiver used in a communication system wherein a signalling preamble is sent to said receiver prior to sending other information, said bias control circuit comprising:
   a coupling capacitor having an input terminal and an output terminal;
   means for selectively coupling said capacitor input terminal to a received input signal in response to a control signal;
   means for biasing said capacitor input terminal to a desired voltage in response to said control signal; and
   controller means for providing said control signal in response to the reception of said signalling preamble,
   whereby said coupling capacitor is properly biased for the subsequent reception of said other information.

2. The bias control circuit according to claim 1, further comprising means for maintaining said capacitor output terminal at a desired voltage in response to said biasing means biasing said capacitor input terminal.

3. The bias control circuit according to claim 1, further comprising means for biasing said capacitor output terminal to a desired voltage in response to said control signal.

4. The bias control circuit according to claim 1, further comprising means for determining the average DC voltage level of said received input signal.

5. The bias control circuit according to claim 4, wherein said biasing means applies said average DC voltage level to said capacitor input terminal.

6. The bias control circuit according to claim 1, wherein said signalling preamble exhibits a balanced AC waveform.

7. The bias control circuit according to claim 1, wherein said selective coupling means effectively isolates said capacitor input terminal from said a received input signal when said biasing means biases said capacitor input terminal.

8. The bias control circuit according to claim 1, wherein the value of said coupling capacitor in said bias control circuit is large enough to pass all frequencies of said received input signal above 5 Hertz.

9. A circuit for coupling an AC signal from a input node to a output node, said circuit comprising:
   a capacitor having first and second terminals;
   first switching means for controllably coupling said input node to said first terminal;
   means for determining the average DC voltage level of said AC signal at said input node;
   second switching means for controllably applying said average DC voltage to said first terminal;
   third switching means for controllably applying a reference DC voltage to said second terminal;
   means for coupling said second terminal to said output node; and
   means for controlling said first, second, and third switching means such that said average DC voltage is applied to said capacitor first terminal only during a first time period, and such that said AC signal is coupled from said input node to said output node only during a second time period not overlapping said first time period.

10. The coupling circuit according to claim 9, wherein said controlling means controls said first, second, and third switching means such that said reference DC voltage is applied to said capacitor second terminal during said first time period.

11. The coupling circuit according to claim 9, wherein said third switching means includes feedback means for monitoring the voltage at said capacitor second terminal, and for controllably applying a difference DC voltage to said second terminal, said difference DC voltage being proportional to the difference between said reference DC voltage and the voltage at said second terminal.

12. The coupling circuit according to claim 9, wherein the value of said capacitor is large enough to pass all frequencies of said received input signal above 5 Hertz.

13. The coupling circuit according to claim 9, wherein said first time period is shorter than 5 milliseconds.

14. The coupling circuit according to claim 9, wherein said first, second, and third switching means include CMOS switch devices.

15. A method of receiving coded information in a radio receiver having a signal processor for decoding said information, said method comprising the steps of:
   (a) demodulating a modulated radio frequency (RF) carrier in a radio receiver, thereby providing a received signal;
   (b) determining the average DC voltage level of said received signal during a first time period;
   (c) determining the preferred DC reference voltage level of said signal processor for optimal information decoding;
   (d) precharging a capacitor to a DC precharge voltage during a second time period;
   (e) series coupling said received signal from said receiver to said signal processor through said precharged capacitor; and
   (f) decoding information from said received signal in said signal processor during a third time period, whereby said third time period does not overlap said second time period.

16. The method according to claim 15, wherein step (d) further comprises the steps of:

(1) providing said average DC voltage via a low impedance source to the side of said capacitor which is coupled to said received signal; and (2) providing said DC reference voltage via a low impedance source to the other side of said capacitor during the above step 1.

17. The method according to claim 15, wherein said third time period occurs immediately after said second time period.

18. The method according to claim 15, wherein said information is modulated on said RF carrier utilizing Gaussian minimum shift keying.

19. The method according to claim 15, wherein said radio receiver is adapted to operate in a Time Division Multiplex radio system.

20. The method according to claim 19, wherein said first time period generally corresponds to each TDM bit synchronization word time slot.

21. The method according to claim 19, wherein said third time period generally corresponds to each TDM vocoded speech information time slot.

22. The method according to claim 15, wherein said average DC voltage level is determined by integrating said received signal over an integration time period which is shorter than said first time period.

23. The method according to claim 15, wherein said information is coded such that said received signal exhibits a balanced waveform during said first time period.

24. The method according to claim 15, wherein the value of said capacitor is large enough to pass all frequencies of said received signal above 5 Hertz.

25. The method according to claim 15, wherein said second time period is shorter than 5 milliseconds.

26. A radio receiver used in a communication system wherein a signalling preamble is sent prior to sending other information, said radio receiver comprising:

receiver means for receiving a radio frequency (RF) carrier, thereby providing a received signal;

signal processing means for decoding information from said received signal, said signal processing means having a preferred DC reference voltage level for optimal information decoding;

capacitor means for AC coupling said received signal from said receiver means to said signal processing means;

averaging means for determining the average DC voltage level of said received signal during the time period when said signalling preamble is being received; and biasing means for selectively applying a DC biasing voltage to said capacitor means in response to said averaging means at times other than when said information is being received.

27. The radio receiver according to claim 26, wherein said biasing means includes:

means for providing said average DC voltage via a low impedance source to the side of said capacitor which is coupled to said receiver means; and means for providing said DC reference voltage via a low impedance source to the side of said capacitor which is coupled to said signal processing means.

28. The radio receiver according to claim 26, wherein said information is modulated on said RF carrier utilizing Gaussian minimum shift keying.

29. The radio receiver according to claim 26, wherein said radio receiver is adapted to operate in a Time Division Multiplex radio system.

30. The radio receiver according to claim 29, wherein said preamble time period generally corresponds to each TDM bit synchronization word time slot.

31. The radio receiver according to claim 26, wherein said average DC voltage level is determined by integrating said received signal over an integration time period which is shorter than said preamble time period.

32. The radio receiver according to claim 26, wherein said information is coded such that said received signal exhibits a balanced waveform during said preamble time period.

33. The radio receiver according to claim 26, wherein the value of said capacitor is large enough to pass all frequencies of said received signal above 5 Hertz.

* * * * *